US012656022B2

(12) United States Patent
Jin et al.

(10) Patent No.: US 12,656,022 B2
(45) Date of Patent: Jun. 16, 2026

(54) HELIOSTAT FRAME AND HELIOSTAT THEREOF, AND HELIOSTAT FIELD

(71) Applicant: ZHEJIANG COSIN SOLAR TECHNOLOGY CO., LTD., Hangzhou (CN)

(72) Inventors: Jianxiang Jin, Hangzhou (CN); Neng Xu, Hangzhou (CN); Xiaoling Mi, Hangzhou (CN); Xuzhong Zhang, Hangzhou (CN); Yuanming Huang, Hangzhou (CN); Da Lin, Hangzhou (CN); Xiao Tan, Hangzhou (CN); Zhengping Zhu, Hangzhou (CN); Kangli Chen, Hangzhou (CN); Tingting Xiao, Hangzhou (CN)

(73) Assignee: ZHEJIANG COSIN SOLAR TECHNOLOGY CO., LTD., Hangzhou (CN)

( * ) Notice: Subject to any disclaimer, the term of this patent is extended or adjusted under 35 U.S.C. 154(b) by 492 days.

(21) Appl. No.: 17/785,550

(22) PCT Filed: Jan. 11, 2021

(86) PCT No.: PCT/CN2021/071032
§ 371 (c)(1),
(2) Date: Jun. 15, 2022

(87) PCT Pub. No.: WO2021/143636
PCT Pub. Date: Jul. 22, 2021

(65) Prior Publication Data
US 2023/0008043 A1     Jan. 12, 2023

(30) Foreign Application Priority Data

Jan. 13, 2020     (CN) ......................... 202010031804.3
Jan. 13, 2020     (CN) ......................... 202010032374.7

(51) Int. Cl.
*F24S 25/20*          (2018.01)
*F24S 25/60*          (2018.01)
(Continued)

(52) U.S. Cl.
CPC .............. *F24S 25/20* (2018.05); *G02B 7/183* (2013.01); *H02S 20/00* (2013.01); *F24S 2025/601* (2018.05); *F24S 25/65* (2018.05)

(58) Field of Classification Search
CPC ...... F24S 25/20; F24S 25/65; F24S 2025/804; F24S 23/82; F24S 2025/601; F24S 23/74;
(Continued)

(56) References Cited

U.S. PATENT DOCUMENTS 3,906,927 A      9/1975  Caplan
4,245,895 A  *   1/1981  Wildenrotter ........... H02S 20/30
                                                        136/246
(Continued)

FOREIGN PATENT DOCUMENTS

CN          102354041 A     2/2012
CN         202452753 5      9/2012
(Continued)

OTHER PUBLICATIONS

Machine Translation of CN 202886711 (Year: 2013).*
(Continued)

*Primary Examiner* — Allen R. B. Schult
*Assistant Examiner* — Amy E Carter
(74) *Attorney, Agent, or Firm* — Bayramoglu Law Offices LLC

(57)          ABSTRACT

A heliostat frame includes a primary beam and several secondary beams arranged on the primary beam at intervals. The secondary beams are fixed on the primary beam along an extending direction of a center axis of the primary beam, and the secondary beam is provided with several supporting
(Continued)

block assemblies. The supporting block assembly includes supporting blocks and adhesive sheets. The supporting blocks are connected with a reflective surface of the heliostat through the adhesive sheets. A height of each of the supporting blocks is configured according to its position on the secondary beam, so that a line connected by centers of top surfaces of all of the supporting blocks on the secondary beam is arc-shaped. The heliostat frame reduces the requirements for the manufacturing accuracy of the secondary beam while guaranteeing surface accuracy of the heliostat, thereby effectively reducing the production costs and improving the manufacturing efficiency.

20 Claims, 5 Drawing Sheets

(51) Int. Cl.
| | |
|---|---|
| *F24S 25/65* | (2018.01) |
| *G02B 7/183* | (2021.01) |
| *H02S 20/00* | (2014.01) |

(58) Field of Classification Search
CPC ......... F24S 23/70; G02B 7/183; G02B 7/182; Y02E 10/45; Y02E 10/47
USPC ......... 126/696; 359/849, 853, 855, 871, 876
See application file for complete search history.

(56) References Cited

U.S. PATENT DOCUMENTS

| | | | | |
|---|---|---|---|---|
| 6,217,178 | B1 * | 4/2001 | Drumheller | F24S 25/60 |
| | | | | 359/849 |
| 8,091,544 | B1 * | 1/2012 | Ochadlick, Jr. | F24S 30/425 |
| | | | | 126/684 |

| | | | | |
|---|---|---|---|---|
| 2009/0260753 | A1 | 10/2009 | Selig et al. | |
| 2012/0048261 | A1 * | 3/2012 | Kuntze | H10F 77/488 |
| | | | | 126/696 |
| 2012/0160235 | A1 * | 6/2012 | Terry | F24S 25/65 |
| | | | | 126/696 |
| 2013/0087138 | A1 * | 4/2013 | Ubach Cartategui | F24S 25/70 |
| | | | | 126/696 |
| 2014/0182580 | A1 * | 7/2014 | Marcotte | F24S 30/425 |
| | | | | 126/696 |
| 2015/0015975 | A1 * | 1/2015 | Huss | F24S 23/70 |
| | | | | 359/853 |
| 2019/0036474 | A1 * | 1/2019 | Schuit | H02S 20/23 |

FOREIGN PATENT DOCUMENTS

| | | | | | | |
|---|---|---|---|---|---|---|
| CN | 202748522 | U | * | 2/2013 | | |
| CN | 202886711 | U | * | 4/2013 | ............. | G02B 7/198 |
| CN | 204479831 | U | * | 7/2015 | | |
| CN | 204575941 | U | * | 8/2015 | | |
| CN | 205316706 | U | | 6/2016 | | |
| CN | 105928228 | A | | 9/2016 | | |
| CN | 106322784 | /3 | | 1/2017 | | |
| CN | 109812994 | A | * | 5/2019 | | |
| WO | WO-2018048890 | A1 | * | 3/2018 | ............. | F16L 23/00 |

OTHER PUBLICATIONS

Machine Translation of CN204479831 (Year: 2015).*
Machine Translation of CN204575941 (Year: 2015).*
Machine Translation of CN 202748522 (Year: 2013).*
Machine Translation of CN 109812994 (Year: 2019).*
International Search Report, issued in PCT/CN2021/071032, dated Mar. 31, 2021.
Written Opinion, issued in PCT/CN2021/071032, dated Mar. 31, 2021.
European Search Report, issued in PCT/CN2021/071032, prepared by European Patent Office, dated Nov. 1, 2024.

* cited by examiner

HELIOSTAT FRAME AND HELIOSTAT THEREOF, AND HELIOSTAT FIELD

BACKGROUND OF THE INVENTION

Field of the Invention

The invention belongs to the technical field of solar thermal power generation, particularly to a heliostat frame and a heliostat thereof and a heliostat field.

Description of the Prior Art

Solar energy is increasingly used as a clean and renewable energy source. Solar thermal power generation technology is an emerging solar energy utilization technology following photovoltaic power generation technology. The tower solar thermal power generation technology has received extensive attention due to its benefits of energy storage and peak regulation.

A heliostat in a tower solar thermal power generation system achieves the functions of concentrating the sunlight onto a solar receiver, generating high-temperature and high-pressure steam by heating the heat-absorbing-medium or heat-storage-medium in the solar receiver and further driving the turbine to generate electricity. The performance of the heliostat frame determines the quality of the sun ray spot, and the quality of the sun ray spot reflected by the heliostat directly affect the efficiency of the concentrated solar thermal power generation system. In the tower solar thermal power system, the heliostat is used to concentrate the sunlight and reflect it to the solar receiver at the top of a solar tower. Generally, in order to improve the light concentration effect of the heliostat, the reflective surface of the heliostat is normally set to a specific curved surface. In a traditional heliostat, the secondary beam is first machined to a specific arc according to the upfront design, and then connects to the reflective surface, so that the reflective surface also has a certain radian. This design has higher requirements on the processing of the secondary beam, which increases the difficulty of processing and the cost accordingly. Furthermore, in the later stage of useful life, the secondary beam with a specific radian is easy to deform, which causes the reflective surface to deviate from the specific curved surface set theoretically and affects the efficiency of the concentrated solar thermal power generation system.

On the other hand, in the existing heliostat, the structure of heliostat frame is less stable, and in particular, the bracket connecting the primary beam with the secondary beam is easy to deform due to external forces such as wind after being used for a long time, which makes the reflection accuracy of the heliostat reduced.

SUMMARY OF THE INVENTION

The invention provides a heliostat frame and a heliostat thereof. By providing a supporting block assembly, the heliostat frame provided by the invention reduces the requirements for the manufacturing accuracy of the secondary beam while guaranteeing a surface accuracy of the heliostat, thereby effectively reducing the production costs and improving the manufacturing efficiency.

The invention further provides a heliostat frame. By configuring a center bracket connecting a primary beam and the secondary beam, the heliostat frame has a higher reliability and endurance, and can still maintain a good shape after long-term use.

The technical solution of the invention is as follows:

A heliostat frame includes a primary beam and several secondary beams arranged on the primary beam at intervals, and the secondary beams are fixed on the primary beam along an extending direction of a center axis of the primary beam, the secondary beams are provided with several supporting block assemblies;

the supporting block assembly comprises supporting block and adhesive sheet, and the supporting block is connected with a reflective surface of the heliostat through the adhesive sheet;

a height of each of the supporting blocks is configured according to its position on the secondary beam, so that a line connected by centers of top surfaces of all of the supporting blocks on the secondary beam is arc-shaped.

Preferably, the supporting blocks are connected to the secondary beams fixedly or detachably.

Preferably, the secondary beam includes at least one secondary-beam top surface, and the supporting block is disposed at an outer surface of the secondary-beam top surface; or the supporting block is embedded on the secondary-beam top surface.

Preferably, a first through hole is disposed on the secondary-beam top surface, and the supporting block is embedded in the first through hole; the supporting block has a step-shaped longitudinal cross section, and comprises a supporting-block first portion and a supporting-block second portion; a radial width of the supporting-block first portion is smaller than that of the supporting-block second portion, and the supporting-block first portion is embedded in the first through hole on the secondary beam to be connected with the secondary-beam top surface; the supporting-block second portion is connected with the adhesive sheet.

Preferably, a height of the supporting-block first portion is smaller than or equal to a thickness of the secondary-beam top surface.

Preferably, the supporting block is connected to the secondary beam fixedly by way of bonding, riveting or welding.

Preferably, a center position of the supporting block is provided with a second through hole, and a bottom portion of the adhesive sheet is provided with a threaded hole; a bolt passes through the first through hole of the secondary beam and the second through hole of the supporting block to be in threaded connection with the threaded hole of the adhesive sheet.

Preferably, an anti-loose washer is further disposed between the bolt and an inner surface of the secondary-beam top surface.

Preferably, a top surface of the supporting block is configured centrally symmetrically along a plane bisecting the secondary-beam top surface vertically.

Preferably, the secondary beam includes two side surfaces respectively extending from two sides in a length direction of the secondary beam.

Preferably, the secondary beam further includes a bending portion extending from a free end in a length direction of the side surface thereof.

Preferably, the invention further includes a branch beam; the branch beam includes a branch-beam top surface and two side surfaces respectively extending from two sides in a length direction of the branch-beam top surface; several hollow holes are disposed on the branch-beam top surface, and a projection of the hollow hole on the secondary beam corresponds to an installation site of the supporting block on the secondary beam.

Preferably, gaskets are all disposed at where the branch beam is connected with the secondary beam, the branch beam is connected with the secondary beam through the gaskets, and wherein a sum of a thickness of the gasket and a width between outer sides of two side surfaces of the branch beam is equal to a width between two side surfaces of the secondary beam.

Preferably, the adhesive sheet comprises a tray used to be fixedly connected with the reflective surface of the heliostat and a base used to support the tray, and a cross section of the tray is thick at the center and gradually becomes thinner at the edges in a radial direction.

Preferably, the center of the tray is provided with a third through hole.

Preferably, in the length direction of the same secondary beam, a distance between two adhesive sheets of two sides of a seam of two adjacent reflective units is smaller than a distance between the two adjacent adhesive sheets at other positions.

Preferably, each of the supporting blocks is formed by stacking and combining two or more supporting block gaskets.

Preferably, the invention further includes several center brackets sleeved fixedly on the primary beam, and the secondary beam is connected with the primary beam through the center bracket;

the center bracket comprises a first supporting sheet and a second supporting sheet that are spaced apart and parallel to each other, and the first supporting sheet is fixedly connected with the second supporting sheet through at least one supporting member located therebetween; and wherein the first through hole is disposed on the first supporting sheet, the second through hole is disposed on the second supporting sheet, and the first through hole and the second through hole form a center-bracket through hole;

the center bracket is sleeved on the primary beam through the center-bracket through hole and connected fixedly with the primary beam, an installation point used to be connected with the secondary beam is disposed on the center bracket, and the secondary beam is connected with the center bracket through the installation point.

Preferably, the supporting member is a supporting post or a socket arranged concentrically with the primary beam or a reinforcing rib arranged between the first supporting sheet and the second supporting sheet.

Preferably, a first installation spot is disposed on the center bracket; the first installation spot is formed by two corresponding installation spot units located on the first supporting sheet and the second supporting sheet respectively; the first installation spot is disposed on an upper portion of the center bracket, and the secondary beam is connected with the center bracket at the first installation spot.

Preferably, all of the center brackets sleeved on the primary beam are provided with the first installation spot; and in a direction respectively extending from a middle position of the primary beam to two ends of the primary beam, distances from all of the first installation spots on the several center brackets to a center axis of the primary beam is sequentially increased, so that all of the first installation spots are distributed in an arc with low middle parts and high ends; and the first installation spots on all of the center brackets are configured in mirror symmetry along a plane perpendicular to the center axis of the primary beam and bisecting the primary beam.

Preferably, a projection of the center bracket on a plane perpendicular to a center axis of the center-bracket through hole is of a hexagonal structure, and a length of a top side of the projection is smaller than a length of a bottom side thereof.

Preferably, first supporting posts are disposed respectively at two sets of top corners corresponding to an upper portion of the first supporting sheet and an upper portion of the second supporting sheet, and second supporting posts are disposed respectively at two sets of left and right top corners corresponding to a lower portion of the first supporting sheet and a lower portion of the second supporting sheet.

Preferably, a third supporting post is further disposed between the first supporting sheet and the second supporting sheet, and the third supporting post is located at the upper portion of the center bracket and just below a midpoint of a line connecting the two first supporting posts.

Preferably, a distance from the third supporting post to the center axis of the center-bracket through hole is equal to a distance from the two second supporting posts to the center axis of the center-bracket through hole.

Preferably, in each of the center brackets, the two first supporting posts form a first connecting line segment after two connecting points on the first supporting sheets are connected with each other, and the two first supporting posts form a second connecting line segment after two connecting points on the second supporting sheets are connected with each other;

the installation spot unit corresponding to the first installation spot on the first supporting sheet is located on a vertical bisector of the first connecting line segment along a surface of the first supporting sheet;

the installation spot unit corresponding to the first installation spot on the second supporting sheets is located on a vertical bisector of the second connecting line segment along a surface of the second supporting sheet.

Preferably, a plane where the first connecting line segment and the second connecting line segment are located is a reference plane, and the number of the center brackets with the first installation spot located above the reference plane is equal to the number of the center brackets with the first installation spot located below the reference plane in the several center brackets sleeved on the primary beam.

Preferably, the first supporting sheet and the second supporting sheet are arranged symmetrically and parallel to each other.

Preferably, the secondary beam is arc-shaped, and a lowest point of the secondary beam is located at a position where the center bracket is connected with the secondary beam.

Preferably, a distance from the center axis of the center-bracket through hole to a top surface of the center bracket is greater than a distance from the center axis of the center-bracket through hole to a bottom surface of the center bracket.

Preferably, the secondary beam includes one top surface and two side surfaces extending from two sides in a length direction of the top surface respectively, and an upper portion of the center bracket is sandwiched between the two side surfaces of the secondary beam.

Preferably, the invention further includes branch beams arranged on two sides in an extending direction of the primary beam respectively, the branch beam includes a first branch beam and a second branch beam, and each of the branch beams has one end connected with the center bracket and the other end connected with the secondary beam.

Preferably, an included angle between a straight line passing through a point where the first branch beam is connected with the secondary beam and intersecting perpendicularly to the center axis of the primary beam and an extension line of the first branch beam is greater than or equal to 0° and smaller than or equal to 5°;

an included angle between a straight line passing through a point where the second branch beam is connected with the secondary beam and intersecting perpendicularly to the center axis of the primary beam and an extension line of the second branch beam is greater than or equal to 0° and smaller than or equal to 5°.

Preferably, when the first installation spot is disposed on the center bracket, two installation spots. i.e., the second installation spot and the third installation spot, are further disposed corresponding to the first installation spot on the center bracket; all of the installation spots are formed by two corresponding installation spot units located on the first supporting sheet and the second supporting sheet respectively; the first branch beam is connected with the center bracket at the second installation spot, and the second branch beam is connected with the center bracket at the third installation spot.

Preferably, the first installation spot, the second installation spot and the third installation spot are distributed according to a shape of an isosceles triangle, and the second installation spot and the third installation spot are arranged symmetrically along a vertical plane passing through the first installation spot and the center axis of the primary beam.

Preferably, the first branch beam includes one top surface and two side surfaces extending from two sides in a length direction of the top surface respectively, and one end of the first branch beam is sandwiched between the first supporting sheet and the second supporting sheet of the center bracket;

the second branch beam includes one top surface and two side surfaces extending from two sides in a length direction of the top surface respectively, and one end of the second branch beam is sandwiched between the first supporting sheet and the second supporting sheet of the center bracket.

The invention further provides a heliostat frame, including a primary beam and several bracket units arranged on the primary beam at intervals, the bracket unit being fixed on the primary beam along an extending direction of the center axis of the primary beam, wherein each of the bracket units comprises a center bracket fixedly sleeved on the primary beam and a secondary beam connected with the primary beam through the center bracket, the center bracket comprises a first supporting sheet and a second supporting sheet that are spaced apart and parallel to each other, and the first supporting sheet is fixedly connected with the second supporting sheet through at least one supporting member located therebetween; and wherein a first through hole is disposed on the first supporting sheet, a second through hole is disposed on the second supporting sheet, and the first through hole and the second through hole form a center-bracket through hole;

the center bracket is sleeved on the primary beam through the center-bracket through hole and connected fixedly with the primary beam, an installation point used to be connected with the secondary beam is disposed on the center bracket, and the secondary beam is connected with the center bracket through the installation point.

The invention further provides a heliostat, including a reflective surface of the heliostat and a heliostat frame connected with the reflective surface, wherein the heliostat frame is the heliostat frame according to any one of items mentioned above.

The invention further provides a heliostat field, including the heliostat mentioned above. Compared with the conventional art, the present invention has the following beneficial effects:

In the invention, by providing the supporting block on the secondary beam and setting the thickness of the supporting block specially according to the specific position on the secondary beam where the supporting block is located, the line connected by centers of top surfaces of all of the supporting blocks is arc-shaped, e.g., an arc shape with low middle parts and high ends. In this design, the requirements for the machining accuracy may be effectively lowered, thereby reducing the manufacturing cost and improving the production efficiency. Meanwhile, since all of the supporting blocks have formed a specific radian, the required shape of the reflective surface may be formed quickly only by connecting the reflective surface with the supporting block on a specific site when the reflective surface is installed, thereby effectively simplifying the installation steps.

In the heliostat frame provided by the invention, the center bracket includes the first supporting sheet and the second supporting sheet arranged symmetrically and parallel to each other and the first supporting sheet is connected with the second supporting sheet through the supporting member; with this structure, the bearing capacity of the center bracket may be increased effectively, which is beneficial to increase the reflection area of the heliostat, and meanwhile the risk of deformation of the center bracket during the connection process may be effectively reduced when the center bracket is connected with the secondary beam and the branch beam due to the mutual support between the first supporting sheet and the second supporting sheet. In addition, when the center bracket is assembled with the primary beam, all the center brackets need to be initially positioned and placed on the primary beam, and then welded to the primary beam; however, in the invention, the center bracket adopts a double supporting sheet structure, which is easier to place and has a higher accuracy in initial positioning.

In the invention, with the center bracket of two-sheet form, the secondary beam, the center bracket and the two branch beams will not deform when being connected with each other, and the entire bracket unit is completely symmetrical along the vertical plane passing through the central axis of the secondary beam after the bracket unit is formed by combination while the components in the entire bracket unit being in the same plane, so that the overall supporting capacity has been significantly improved.

In the invention, a double-layered center bracket is combined by using the first supporting sheet and the second supporting sheet, and the two supporting sheets are connected by corresponding supporting posts. When the components such as the secondary beam and the branch beam are connected with the double-layered center bracket, they may be connected with the inner sides of the two supporting sheets simultaneously. Although they are still forced on a single side for each of the supporting sheets, the two supporting sheets may be supported mutually as the two supporting sheets are connected by the supporting posts, so as to guarantee that the bearing capacity is significantly improved and the cost is affordable without increasing the thickness of the supporting sheet significantly. Meanwhile, since the thickness of the two supporting sheets is not large, all of the supporting sheets may be connected to the primary beam by full welding when each of them is connected to the primary beam, thereby ensuring the strength of connecting the whole center bracket with the primary beam and preventing the center bracket from falling off from the surface of the primary beam.

Certainly, any one product for implementing the present invention is unnecessary to achieve all the above advantages at the same time.

Figure 1:
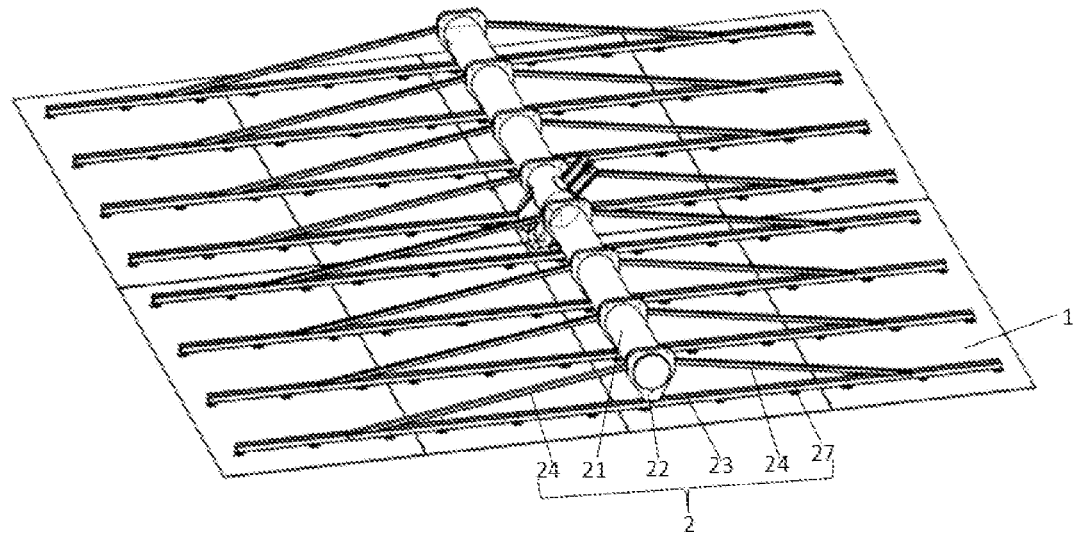
FIG. 1 is an assembly view of a heliostat body according to Embodiment 1 of the invention.

Reference numerals in figures: 1—reflective surface, 2—bracket unit, 21—primary beam, 22—center bracket, 221—first supporting sheet, 222—second supporting sheet, 223—first supporting post, 224—center-bracket through hole, 225—second supporting post, 226—third supporting post, 227—first installation spot, 228—second installation spot, 229—third installation spot, 23—secondary beam, 24—branch beam, 241—first branch beam, 242—second branch beam, 25—anti-loose washer, 26—supporting block, 27—adhesive sheet, 28—gasket, 231—secondary-beam top surface, 232—secondary beam side surface, 233—first through hole, 251—hollow hole, 261—supporting-block first portion, 262—supporting-block second portion, 263—second through hole, 271—bolt, 272—tray, 273—third through hole, 274—base, 275—thread hole, a—top side, b—bottom side.

DESCRIPTION OF THE PREFERRED EMBODIMENTS

The following further describes the present invention in combination with specific embodiments. It should be understood that these embodiments are only used for illustrating the present invention, but not for the limitation of the scope of the present invention. Improvements and adjustments made by those skilled in the art according to the invention in practical applications still belong to the protection scope of the invention.

In order to better illustrate the invention, the invention is described in detail below with reference to the accompanying drawings.

Embodiment 1

A heliostat frame, with reference to FIG. 1, includes a bracket unit 2, the bracket unit 2 including a primary beam

21 and several secondary beams 23 arranged on the primary beam 21 at intervals, the secondary beams 2233 being fixed on the primary beam along an extending direction of a center axis of the primary beam 21, wherein the secondary beam 23 is provided with several supporting block assemblies;

the supporting block assembly includes supporting blocks 26 and adhesive sheets 27, and the supporting blocks 26 are connected with a reflective surface 1 of the heliostat through the adhesive sheets 27;

a height of each of the supporting blocks 26 is configured according to its position on the secondary beam 23, so that a line connected by centers of top surfaces of all of the supporting blocks on the secondary beam 23 is arc-shaped.

In a traditional heliostat, in order to set the reflective surface of the heliostat to become a specific curved surface, the secondary beam is required to be set to have a specific radian during the assembly, so that there are high requirements for the machining accuracy of the secondary beam, which includes, but is not limited to the radian and the surface smoothness of the secondary beam, wherein, on the one hand, the secondary is required to be processed to be in a specific arc shape, and on the other hand, the surface of the secondary beam is required to be controlled in the smoothness, so that the radian when the secondary beam is connected with the reflective surface is close to a theoretical radian and a high accuracy of the assembly is further required, thereby significantly increasing the manufacturing cost of the heliostat and reducing the assembly efficiency. In the invention, by providing the supporting block 26 on the secondary beam 23 and specially setting the thickness of the supporting block 26 according to the specific position on the secondary beam 23 where the supporting block 26 is located, the line connected by centers of top surfaces of all of the supporting blocks 26 is arc-shaped, e.g., an arc shape with low middle parts and high ends. In this design, the requirements for the machining accuracy of the secondary beam 23 may be effectively lowered, thereby reducing the manufacturing cost and improving the production efficiency. Meanwhile, since all of the supporting blocks 26 have formed a specific radian, the required shape of the reflective surface 1 may be formed quickly only by connecting the reflective surface 1 with the supporting block on a specific site when the reflective surface is installed, thereby effectively simplifying the installation steps. In addition, a preset thickness of the supporting block 26 may be adjusted according to parameters such as the position at which the supporting block 26 is located on the secondary beam, a flatness of the secondary beam at this position, and a theoretically-required radian, so that the supporting block has a height matched with the height required by the theoretical radian, thereby significantly reducing the requirements for the surface flatness of the secondary beam 23.

Figure 2:
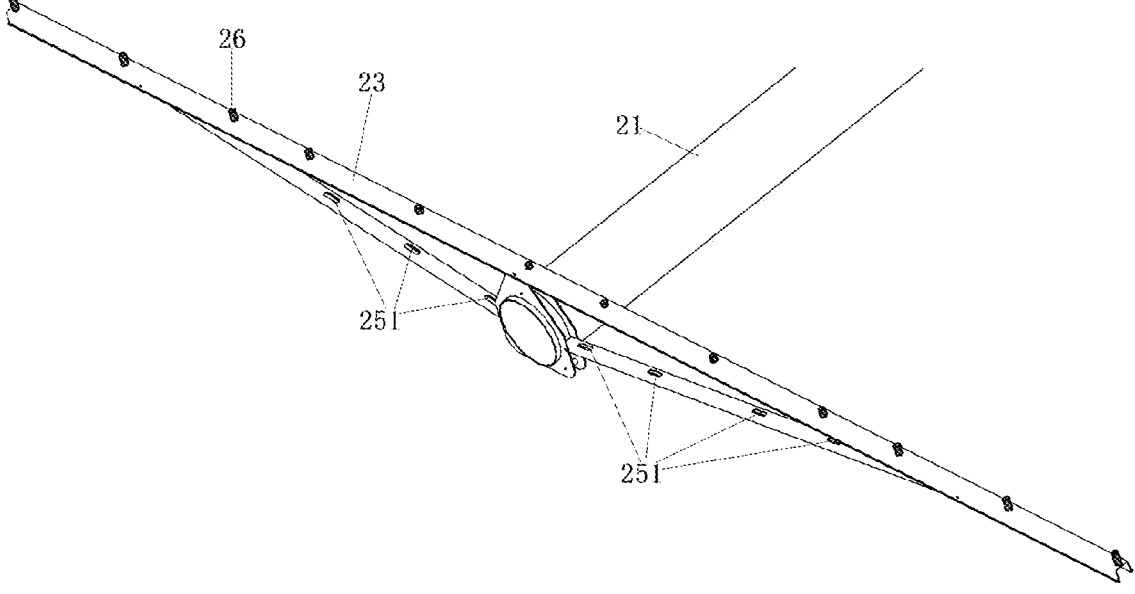
FIG. 2 is a partially enlarged view of a bracket unit according to Embodiment 1 of the invention.

The way in which the secondary beam 23 is connected with the primary beam 21 is not limited by the application, and may be the connection way in the prior art such as connecting the secondary beam 23 with the primary beam through the existing supporting base, supporting bracket and so on or directly welding the secondary beam onto the primary beam or connecting the secondary beam with the primary beam by using the center bracket 22 shown in FIG. 2. The center bracket 22 includes two supporting sheets that are spaced apart and parallel to each other, and the two supporting sheets are fixedly connected with each other through at least one supporting member located therebetween; a through hole is disposed on both two supporting sheets to form a center-bracket through hole, and the center bracket 22 is sleeved on the primary beam 21 through the center-bracket through hole and fixedly connected with the primary beam 21; the center bracket 22 is further provided with installation sites for the secondary beam 23 to be installed, and the secondary beam is connected on the primary beam 21 through the center bracket 22.

The secondary beam 23 may be of a linear type or a curve type. The thickness of the supporting block is finally set according to the position of the supporting block on the secondary beam to meet the needs required by the theoretical radian of the reflective surface, which is not actually affected whether the secondary beam is of the linear type or the curve type. However, in order to reduce the cost, preferably the secondary beam may be of the linear type.

Further introduction is made for the way in which the supporting block 26 is connected with the secondary beam 23 as below.

The supporting block 26 is connected with the secondary beam 23 fixedly or detachably.

The secondary beam 23 includes at least one secondary-beam top surface 231, and the supporting block 26 is disposed at an outer surface of the secondary-beam top surface 231; or the supporting block 26 is embedded on the secondary-beam top surface 231.

Moreover, the supporting block 26 may be connected with the secondary beam 23 by way of four methods:

Method 1: the supporting block 26 is disposed on the outer surface of the secondary-beam top surface 231 by way of fixed connecting method, which includes, but is not limited to glued adhesion, welding and so on; the shape of the supporting block 26 includes, but is not limited to a block shape or a ring shape; for example, the supporting block 26 may be a supporting ring, which is directly glued or welded onto the secondary-beam top surface 231;

Method 2: the supporting block 26 is embedded onto the secondary-beam top surface 231 by way of fixed connecting method, which includes, but is not limited to pressure-riveting, glued adhesion or welding to be fixedly connected with the secondary beam;

Method 3: the supporting block 26 is disposed on the outer surface of the secondary-beam top surface 231 by way of detachable connecting method; for example, a hole position is disposed correspondingly at the secondary-beam top surface 231 and the supporting block 26, and then a bolt directly passes through the hole position to be connected with a nut so that the supporting block 26 is connected with the secondary-beam top surface 231;

Method 4: the supporting block 26 is embedded onto the secondary-beam top surface 231 by way of the detachable connecting method.

Figure 6:
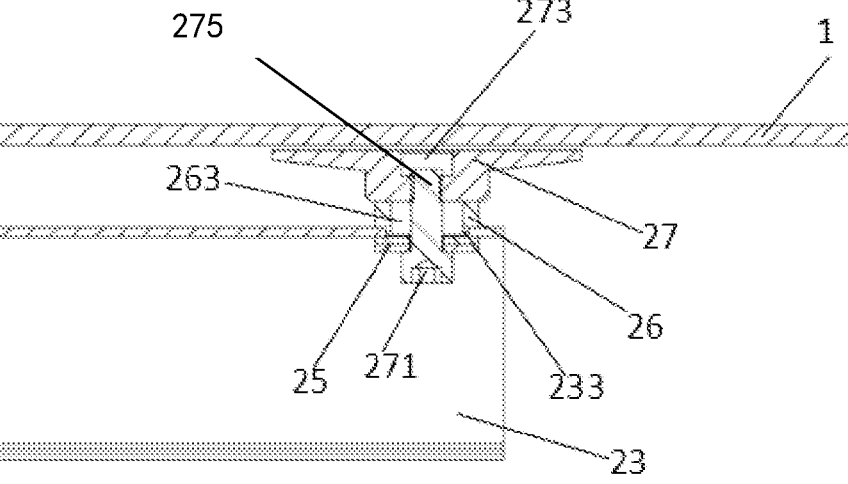
FIG. 6 is a view of connecting a supporting block with an adhesive sheet according to Embodiment 1 of the invention.
Figure 7:
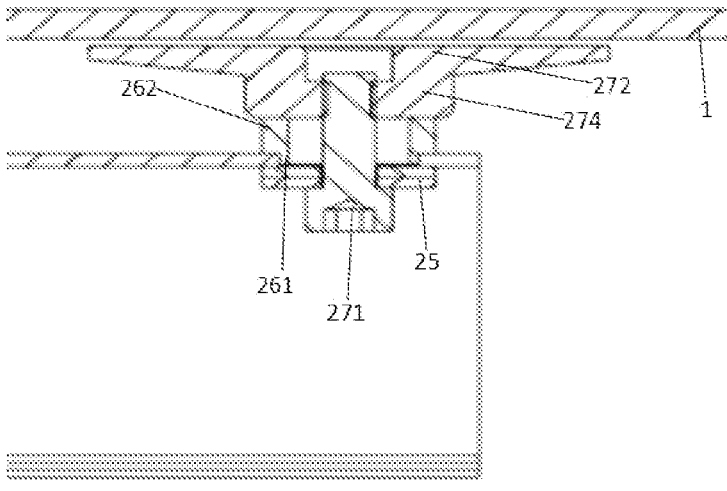
FIG. 7 is a view of connecting a supporting block with an adhesive sheet according to Embodiment 1 of the invention.

For the embedding method in Method 2 and Method 4, with reference to FIGS. 6 and 7, a first through hole 233 is disposed on the secondary-beam top surface 231, and the supporting block 26 is embedded in the first through hole 233; the supporting block 26 has a step-shaped longitudinal cross section, and includes a supporting-block first portion 261 and a supporting-block second portion 262; a radial width of the supporting-block first portion 261 is smaller than that of the supporting-block second portion 262, and the supporting-block first portion 261 is embedded in the first through hole 233 on the secondary beam 23 to be connected with the secondary-beam top surface 231; the supporting-block second portion 262 is connected with the adhesive sheet 27. With this structure, when the supporting block 26 is embedded into the secondary beam 23, there is no glue or welding material between the outer surface of the secondary-beam top surface 231 and a bottom surface of the supporting block 26, so that a height of the supporting block 26 on the secondary-beam top surface 231 may be controlled more conveniently and accurately, thereby making the surface shape of the reflective surface of the heliosat more accurate.

Furthermore, the supporting block 26 may be embedded onto the secondary-beam top surface 231 by a threaded connecting method. Specifically, a center position of the supporting block 26 is provided with a second through hole 263, and a bottom portion of the adhesive sheet 27 is provided with a threaded hole 275; a bolt 271 passes through the first through hole 233 of the secondary beam 23 and the second through hole 263 of the supporting block 26 to be in threaded connection with the threaded hole 275 of the adhesive sheet 27. With this design, the reflective surface 1 may be separated from the heliostat frame conveniently, thereby facilitating the maintenance of the heliostat. In addition, in order to prevent the bolt 271 from loosening during the long-term operation of the heliostat, an anti-loose washer 25 may be further disposed between the bolt 271 and an inner surface of the secondary-beam top surface 231, and preferably the anti-loose washer 25 may be selected as a dual-stacked self-locking washer.

Further introduction is made for the supporting block 26 as below.

A height of the supporting-block first portion 261 is smaller than or equal to a thickness of the secondary-beam top surface 231. If the height of the supporting-block first portion 261 is greater than the thickness of the secondary-beam top surface 231, the nut or the anti-loose washer is in direct contact with a bottom portion of a bottom plate of the supporting-block first portion 261, which causes the secondary beam 23, the adhesive sheet 27 and the supporting block 26 not to be connected as a whole, thereby being unable to ensure the reliability in connecting the three.

A top surface of the supporting block 26 is configured mirror symmetry along a plane bisecting the secondary-beam top surface 231 vertically. The mirror-symmetrical arrangement here only refers to the mirror-symmetrical arrangement of the center of the top surface of the supporting block 26, and the thicknesses of the supporting blocks 26 are not necessarily mirror-symmetrical. With this design, it can be ensured that a midpoint of the secondary beam 23 is the lowest point of the reflective surface 1, so that the surface shape of the reflective surface 1 is more uniform and the light-converging effect is better.

Each of the supporting blocks 26 may be formed by stacking and combining two or more supporting block gaskets (not shown in the figures), and the height of the supporting block may be adjusted by changing the thickness or the number of the supporting block gasket.

Further introduction is made for the secondary beam 23 as below:

In addition to the secondary-beam top surface 231, the secondary beam may further include at least one side surface disposed below the secondary-beam top surface and connected with the secondary-beam top surface, so that the secondary beam is T-shaped, L-shaped or π-shaped and so on.

Figure 4:
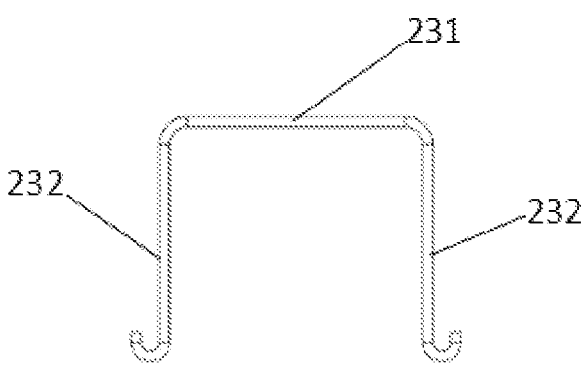
FIG. 4 is a cross-section view of a secondary beam according to Embodiment 1 of the invention.

With reference to FIG. 4, the secondary beam 23 includes two side surfaces, i.e., secondary beam side surfaces 232, respectively extending from two sides in a length direction of the secondary beam. This arrangement may increase the rigidity of the secondary beam itself and prevent the entire frame from being deformed after the assembly is completed.

The two side surfaces respectively extending from two sides in the length direction of the secondary beam causes the secondary beam to form a bent plate, and with the same thickness, the rigidity of the bent plate with two side surfaces is better than that of the bent plate with one side surface and a sheet without side surfaces.

The secondary beam 23 further includes a bending portion 233 extending from a free end in a length direction of the side surface thereof. In other words, the free end of the secondary-beam side surface 232 is provided with the bending portion 233. By providing the bending portion 233, the rigidity of the secondary beam 23 may be effectively enhanced, thereby reducing the risk of deformation for the secondary beam 23.

Furthermore, the bracket unit 2 further includes branch beams 24. Each of the branch beams 24 has one end connected with the primary beam 21 and the other end connected with the secondary beam 23 for supporting the secondary beam.

Figure 3:
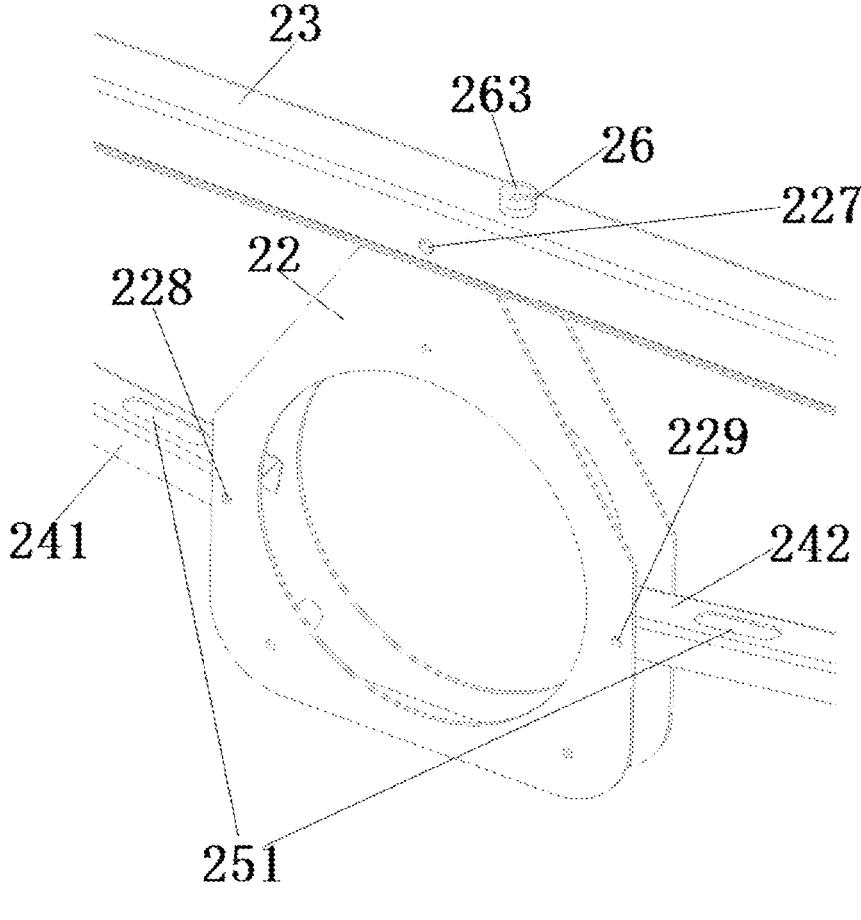
FIG. 3 is an enlarged view of a center bracket according to Embodiment 1 of the invention.

With reference to FIGS. 2 and 3, corresponding to the secondary-beam top surface 231 and the secondary-beam side surface 232 of the secondary beam 23, the branch beam 24 includes a branch-beam top surface and two side surfaces respectively extending from two sides in a length direction of the branch-beam top surface; several hollow holes 251 are disposed on the top surface of the branch-beam 24, and a projection of the hollow hole 251 on the secondary beam 23 corresponds to an installation site of the supporting block 26 on the secondary beam 23. By providing the hollow holes 251 on the branch beam 24, the wind resistance of the heliostat is effectively reduced, the materials are saved, and the manufacturing costs are decreased. At the same time, a projection of the hollow hole 251 of the branch beam 24 on the secondary beam 23 corresponds to the installation site of the supporting block 26 on the secondary beam 23. With this design, when the heliostat is assembled, an installation space may be reserved for the installation of the supporting blocks 26 and the adhesive sheets 27, which is convenient for operation.

Figure 5:
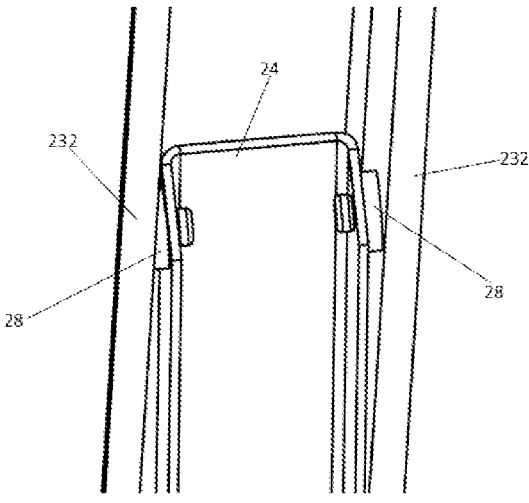
FIG. 5 is a view of connecting a secondary beam with a branch beam according to Embodiment 1 of the invention.

Specifically, with reference to FIG. 5, when the branch beam 24 is connected with the secondary beam 23, the branch-beam top surface extends into a groove formed by the secondary-beam top surface and the secondary-beam side surface, and the branch-beam side surface is connected with the secondary-beam side surface. Gaskets 28 are all disposed at where the branch beam 24 is connected with the secondary beam 23, the branch beam 24 is connected with the secondary beam 23 through the gaskets 28, and in which a sum of the thickness of the gasket 28 and a width between outer sides of two side surfaces of the branch beam is equal to a width between two side surfaces of the secondary beam. Due to practical structural limitations, the width of the secondary beam 23 is greater than that of the branch beam 24. As a result, when the secondary beam 23 is connected with the branch beam 24, the side surface of the secondary beam 23 is easily caused to be deformed. By providing the gaskets 28, a width difference between the secondary beam 23 and the branch beam 24 may be eliminated, thereby preventing the secondary beam from deforming when the secondary beam 23 is connected with the branch beam 24.

Further introduction is made for the adhesive sheet 27 as below.

With reference to FIG. 7, the adhesive sheet 27 includes a tray 272 used to be fixedly connected with the reflective surface 1 of the heliostat and a base 274 used to support the tray 272, and a cross section of the tray 272 is thick at the center and gradually becomes thinner at the edges in a radial direction. If the tray 272 adopts this design; for one thing, the excessive concentration of stress on the tray 272 may be prevented; for another thing, since the reflective surface 1 has a certain radian and is connected with the tray 272 with the structure, the surface of the tray may be properly deformed with the reflective surface by fastening the bolt 271 used to fix the adhesive sheet 27, thereby making the reflective surface form a smoother arc surface.

With reference to FIG. 6, the center of the tray 272 is provided with a third through hole 273. Creating a connection between the adhesive sheet 27 and the reflective surface 1, is generally by applying glue at the position corresponding to the adhesive sheet 27 on the reflective surface 1 and then adhering the adhesive sheet 27 to the corresponding position. When the adhesive sheet 27 is adhered to the reflective surface 1, the glue applied on the surface of the reflective surface 1 flow to the outer edge of the tray 272 and the middle part of the tray 272. Therefore, in order to ensure that the thickness of the adhesive layer between the tray 272 and the reflective surface 1 is consistent, the excess glue flowing to the center of the tray may be carried by providing the third through hole 273 on the center of the tray 272.

In the length direction of the same secondary beam 23, a distance between two adhesive sheets 27 of two sides of a seam of two adjacent reflective units of the reflective surface 1 is smaller than a distance between the two adjacent adhesive sheets 27 at other positions. Since the reflective surface of the heliostat has a larger area, the reflective surface is always subjected to wind pressure in windy weather, whether the airflow flows from the upper surface of the reflective surface to the back thereof or from the back of the reflective surface to the upper surface thereof. Since the flowing airflow may only pass through the seam between two adjacent reflective units, it may cause the edge of the reflective unit to vibrate violently, and the long-term severe vibration may cause the reflective unit to be broken or the connection between the reflective unit and the adhesive sheet to fail. In the invention, by narrowing the distance between two adhesive sheets arranged on two sides of two adjacent reflective units, the vibration of the edge of the reflective unit may be better limited, thereby improving the wind resistance of the reflective surface.

Furthermore, for the reflective surface 1, an aspect ratio of the reflective surface ranges from 1.2 to 1.6.

Embodiment 2

Figure 8:
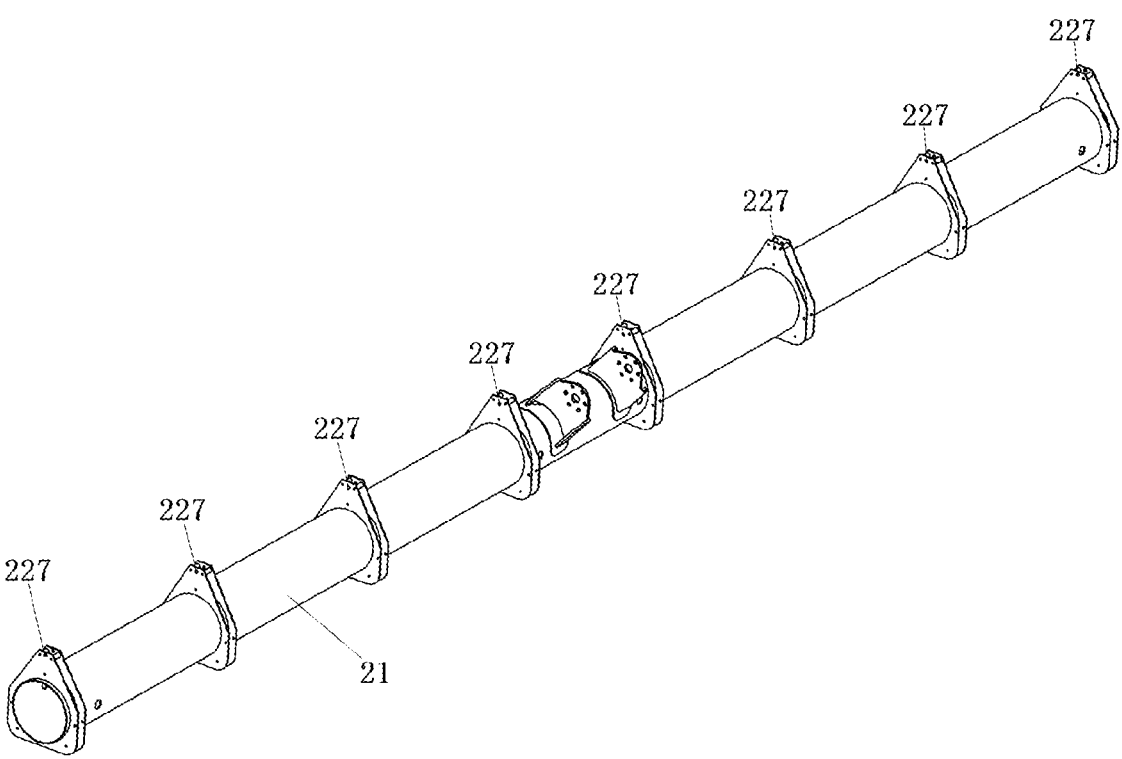
FIG. 8 is an assembly view of the primary beam and a plurality of center brackets according to Embodiment 2 of the invention.
Figure 9:
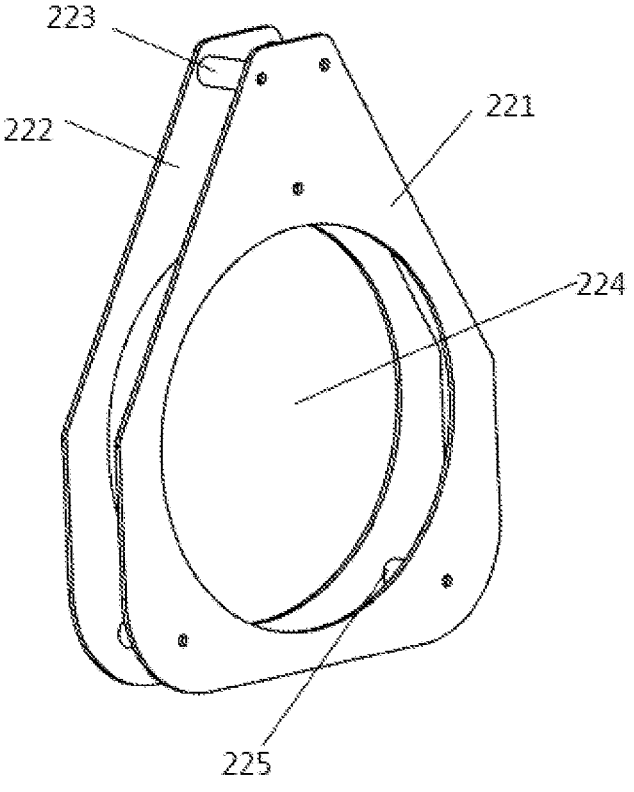
FIG. 9 is a front view of a center bracket according to Embodiment 2 of the invention.

With reference to FIGS. 1 and 8, a heliostat frame includes a primary beam 21 and several bracket units 2 arranged on the primary beam 21 at intervals, and the bracket unit 2 is fixed on the primary beam along an extending direction of the center axis of the primary beam 21, wherein each of the bracket units 2 includes a center bracket 22 fixedly sleeved on the primary beam 21 and a secondary beam 23 connected with the primary beam 21 through the center bracket 22;

the center bracket 22 includes a first supporting sheet 221 and a second supporting sheet 222 that are spaced apart and parallel to each other, and the first supporting sheet 221 is fixedly connected with the second supporting sheet 222 through at least one supporting member located therebetween; and wherein a first through hole is disposed on the first supporting sheet 221, a second through hole is disposed on the second supporting sheet, and the first through hole and the second through hole form a center-bracket through hole 224;

the center bracket 22 is sleeved on the primary beam 21 through the center-bracket through hole 224 and connected fixedly with the primary beam 21, an installation point used to be connected with the secondary beam is disposed on the center bracket 22, and the secondary beam 23 is connected with the center bracket 22 through the installation point.

In the heliostat frame provided by the embodiment, the center bracket 22 includes the first supporting sheet 221 and the second supporting sheet 222 arranged symmetrically and parallel to each other, and the first supporting sheet 221 is connected with the second supporting sheet 222 through the supporting member. With this structure, the bearing capacity of the center bracket 22 may be increased effectively, which is beneficial to increase the reflection area of the heliostat. Meanwhile, the risk of deformation of the center bracket during the connection process may be effectively reduced when the center bracket 22 is connected with the secondary beam 23 and the branch beam due to the mutual support between the first supporting sheet 221 and the second supporting sheet 222. In addition, when the center bracket 22 is assembled with the primary beam 21, all the center brackets 22 need to be initially positioned, placed on the primary beam 21, and then welded to the primary beam 21. In the invention, the center bracket 22 adopts a double supporting-sheet structure, so that the center bracket 22 is easier to place, and the initial positioning performs with higher accuracy.

Furthermore, the bracket unit 2 further includes branch beams arranged on two sides in an extending direction of the primary beam 21 respectively, the branch beam includes a first branch beam 241 and a second branch beam 242, and each of the branch beams has one end connected with the center bracket 22 and the other end connected with the secondary beam 23. With the branch beams, the secondary beam is further supported.

Furthermore, an included angle is greater than or equal to 0° and smaller than or equal to 5°, and this included angle is the between a straight line passing through a point where the first branch beam 241 is connected with the secondary beam 23 and intersecting perpendicularly to the center axis of the primary beam 21 and an extension line of the first branch beam 241; an included angle is greater than or equal to 0° and smaller than or equal to 5°, and this included angle is between a straight line passing through a point where the second branch beam 242 is connected with the secondary beam 23 and intersecting perpendicularly to the center axis of the primary beam 21 and an extension line of the second branch beam 242. Preferably, the above-mentioned included angles are equal to 0°. i.e., the extension lines of the first branch beam 241 and the second branch beam 242 should intersect perpendicularly with the central axis of the primary beam. However, in actual installation, the extension lines of the first branch beam 241 or the second branch beam 242 may not be able to accurately intersect the central axis of the primary beam 21 perpendicularly due to errors or limitations of the actual structural conditions of the relevant components. The limitation here refers to making the extension lines of the first branch beam 241 and the second branch beam 242 perpendicularly intersect with the center axis of the primary beam 21 as far as possible when objective conditions permit. With this design, after the heliostat is assembled, it can be ensured that the branch beam is mainly subjected to the force along its own axial direction, and the torsional force borne by the first branch beam 241 and the second branch beam 242 may be reduced, thereby reducing the risk of torsional deformation of the first branch beam 241 and the second branch beam 242.

Correspondingly, with reference to FIGS. 3 and 8, three installation spots are disposed on the center bracket 22. i.e., the first installation spot 227, the second installation spot 228, and the third installation spot 229. Each of the installation spots is respectively formed by two corresponding installation spot units located on the first supporting sheet 221 and the second supporting sheet 222. The first installation spot 227 is disposed on an upper portion of the center bracket 22, and the secondary beam 23 is connected with the center bracket 22 at the first installation spot 227. The first branch beam 241 is connected with the center bracket 22 at the second installation spot 228, and the second branch beam 242 is connected with the center bracket 22 at the third installation spot 229. When the secondary beam 23 or the branch beams 23, 24 are connected with the center bracket 22 at the corresponding installation spots, installation holes may be preset at the corresponding spots for the connection; or a locking-riveting process may be utilized at the pre-designed installation spot for the connection, and after the connection is completed by the locking-riveting process, only protrusions will be formed at the corresponding installation spots, but no through holes will be formed.

Furthermore, the first installation spot 227, the second installation spot 228, and the third installation spot 229 are distributed according to a shape of an isosceles triangle, and the second installation spot 228 and the third installation spot 229 are arranged symmetrically along a vertical plane passing through the first installation spot 227 and the center axis of the primary beam. The deformation may occur near the edge of the center-bracket through hole during processing such as heat treatment. By arranging the installation spots symmetrically, a triangular force-supporting structure is formed to ensure that the peripheral edge of the center-bracket through hole 224 is evenly supported, thereby preventing the deformation near the edge of the center-bracket through hole from occurring due to uneven thermal stress.

The secondary beam 23 includes one top surface and two side surfaces extending from two sides in a length direction of the top surface respectively, and an upper portion of the center bracket 22 is sandwiched between the two side surfaces of the secondary beam 23;

the first branch beam 241 includes one top surface and two side surfaces extending from two sides in a length direction of the top surface respectively, and one end of the first branch beam 241 is sandwiched between the first supporting sheet 221 and the second supporting sheet 222 of the center bracket 22 while the other end is sandwiched between the two side surfaces of the secondary beam 23;

the second branch beam 242 includes one top surface and two side surfaces extending from two sides in a length direction of the top surface respectively, and one end of the second branch beam 242 is sandwiched between the first supporting sheet 221 and the second supporting sheet 222 of the center bracket 22 while the other end is sandwiched between the two side surfaces of the secondary beam 23. Through the above arrangement, the secondary beam 23 and the center bracket 22, the secondary beam 23 and the branch beam 24, and the branch beam 24 and the center bracket 22 are all connected with each other through double sides. Compared with the connection through a single connecting point, the structures connected through double sides are more stable.

Furthermore, with reference to FIG. 3, a projection of the center bracket 22 on a plane perpendicular to a center axis of the center-bracket through hole 21 is of a hexagonal structure, and a length of a top side of the projection is smaller than a length of a bottom side thereof. i.e., the first supporting sheet 221 and the second supporting sheet 222 are both of the hexagonal structures and the length of the top side a is smaller than the length of the bottom side b. The hexagonal structure here may be realized by cutting off two adjacent top corners of a square or rectangular supporting sheet or by cutting off the three corners of the triangle, which is not limited here. With the design of using the hexagonal structure and making the length of the top side of the hexagon shorter than the length of the bottom side, the difference of the frame width of different positions of the center bracket 22 may be reduced, thereby reducing the risk of stress deformation of the center bracket 22 due to the large difference in the width of the frame during hot processing such as hot-dip galvanizing. Meanwhile, with this structure, the surface area of the center bracket 22 may be reduced, thereby reducing the wind resistance of the heliostat frame. Furthermore, with this structure, an operation space may be reserved near the position where the center bracket 22 is connected with the secondary beam 23, so as to facilitate the connection between the center bracket 22 and the secondary beam 23 and also to facilitate the installation of other components on the secondary beam 23 at this position.

Furthermore, a distance from the center axis of the center-bracket through hole 224 to a top surface of the center bracket 22 is greater than a distance from the center axis of the center-bracket through hole 224 to a bottom surface of the center bracket 22. i.e., a distance from the center axis of the center-bracket through hole 224 to a top side of the first supporting sheet 221 or the second supporting sheet 222 is greater than a distance from the center axis of the center-bracket through hole 224 to a bottom side of the first supporting sheet 221 or the second supporting sheet 222. Since an upper portion of the center bracket 22 is provided with installation points, used to be connected with the secondary beam. e.g., the first installation spot 227, this design allows a large floating space to be reserved for the preset position of the installation spot on the upper portion of the center-bracket through hole 224 of the center bracket 223. Therefore, the connection position of the secondary beam and the center bracket may be set as required, thereby meeting the requirements of different surface shapes of the heliostat while enabling the mass production of the center bracket.

Furthermore, the supporting member is a supporting post or a reinforcing rib arranged between the first supporting sheet and the second supporting sheet.

Figure 10:
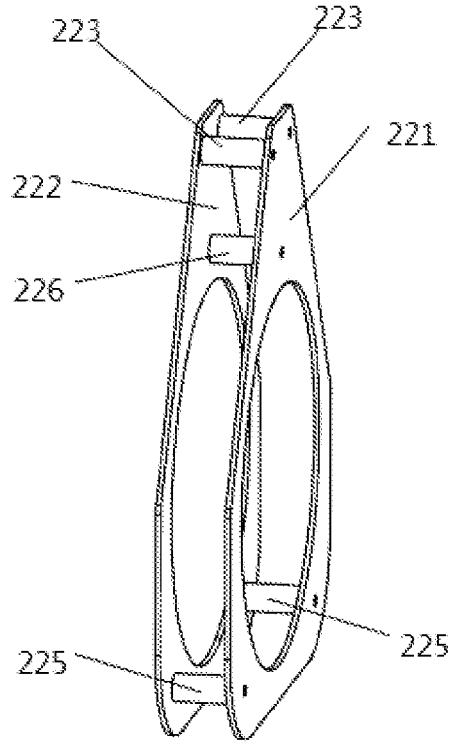
FIG. 10 is a side view of a center bracket according to Embodiment 2 of the invention.

Furthermore, with reference to FIG. 10, first supporting posts 223 are disposed respectively at two sets of top corners corresponding to an upper portion of the first supporting sheet 221 and an upper portion of the second supporting sheet 222, and second supporting posts 225 are disposed respectively at two sets of left and right top corners corresponding to a lower portion of the first supporting sheet 221 and a lower portion of the second supporting sheet 222. The top corner described here merely refers to its near suitable positions rather than defines absolute positions of the first supporting posts 223 and the second supporting posts 225, wherein the two first supporting posts 223 and the two second supporting posts 225 are all configured in mirror symmetry along a vertical plane that vertically bisects the surface of the center bracket 22. With this design, the two first supporting posts 223 and the two second supporting posts 225 are evenly supported between the first supporting sheet 221 and the second supporting sheet 222, and the force of the entire center bracket is made more uniform, and the deformation caused by excessive force in local areas is prevented when the entire frame is assembled.

Furthermore, a third supporting post 226 is further disposed between the first supporting sheet 221 and the second supporting sheet 222, and the third supporting post 226 is located at the upper portion of the center bracket 22 and just below a midpoint of a line connecting the two first supporting posts 223. Since the distance from the center axis of the center-bracket through hole 224 to either a top side of the first supporting sheet 221 or the second supporting sheet 222 is greater than the distance from the center axis of the center-bracket through hole 224 to either a bottom side of the first supporting sheet 221 or the second supporting sheet 222, heights of upper halves of the first supporting sheet 221 and the second supporting sheet 222 of the center bracket are relatively high, which is prone to tipping and deformation when being under the pressure of the upper components of the heliostat frame. By providing the third supporting post 226, the first supporting sheet 221 and the second supporting sheet 222 may be better supported, and the first supporting sheet 221 and the second supporting sheet 222 may be prevented from being deformed when being under pressure.

Furthermore, a distance from the third supporting post 226 to the center axis of the center-bracket through hole is equal to a distance from the two second supporting posts 225 to the center axis of the center-bracket through hole. Since the center bracket 22 is provided with the center-bracket through hole 224, the deformation may occur near the edge of the center-bracket through hole during processing such as heat treatment. With this design, it is ensured that the peripheral edge of the center-bracket through hole 224 is evenly supported, thereby preventing the deformation near the edge of the center-bracket through hole from occurring due to uneven thermal stress.

Furthermore, with reference to FIG. 8, all of the center brackets 22 sleeved on the primary beam 21 are provided with the first installation spot 227; and in a direction respectively extending from a middle position of the primary beam 21 to two ends of the primary beam 21, distances from all of the first installation spots 227 on the several center brackets 22 to a center axis of the primary beam is sequentially increased, so that all of the first installation spots 227 on the several center brackets 22 are distributed in an arc with low middle parts and high ends; and the first installation spots 227 on all of the center brackets 22 are configured in mirror symmetry along a plane perpendicular to the center axis of the primary beam and bisecting the primary beam. Furthermore, the secondary beam 23 is arc-shaped, and a lowest point of the secondary beam 23 is located at a position where the center bracket is connected with the secondary beam. The first installation spots 227 on all of the center brackets 22 are distributed in an arc shape along the extension direction of the primary beam 21, and the secondary beam 23 is also of the arc shape, so that the reflective surface of the heliostat has a certain radian in both the extension direction of the primary beam and the direction perpendicular to the primary beam, thereby concentrating the sunlight better and improving the utilization rate of solar energy.

Furthermore, with reference to FIGS. 3 and 8 to 10, in each of the center brackets 22, the two first supporting posts 223 form a first connecting line segment after two connecting points on the first supporting sheets 221 are connected with each other, and the two first supporting posts 223 form a second connecting line segment after two connecting points on the second supporting sheets 222 are connected with each other; the installation spot unit corresponding to the first installation spot 227 on the first supporting sheet 221 is located on a vertical bisector of the first connecting line segment along a surface of the first supporting sheet; the installation spot unit corresponding to the first installation spot 227 on the second supporting sheets 222 is located on a vertical bisector of the second connecting line segment along a surface of the second supporting sheet. With this design, it is ensured that the first installation spots 227 of all of the center brackets 22 are in the same plane. Meanwhile, in each of the center brackets 22, there are two first supporting posts 223 and one third supporting post 226 supporting around all of the first installation spots 227, thereby reducing the risk of deformation when the center bracket 22 is connected to the secondary beam 23. The first connecting line segment and the second connecting line segment are described both for convenience of description, and the set virtual line segment does not exist in the actual product. The installation spot units on the first supporting sheet 221 and the second supporting sheet 222 corresponding to the first installation spots 227 are located on vertical bisector of the first connecting line segment and the second connecting line segment respectively. With this design, the two first supporting posts 223 may form good supports on both sides of the first installation spots 227, thereby reducing the risk of deformation of the center bracket 22 when the center bracket 22 is connected to the secondary beam 23.

Furthermore, a plane where the first connecting line segment and the second connecting line segment are located is a reference plane, and the number of the center brackets 22 with the first installation spot 227 located above the reference plane is equal to the number of the center brackets 22 with the first installation spot 227 located below the reference plane in the several center brackets 22 sleeved on the primary beam. With this design, it is ensured that the connecting spots between the center bracket 22 and the secondary beam 23 is as close as possible to the first supporting posts 223; the closer the first supporting post 223 is, the better the support effect of the first supporting post 223 on the first supporting sheet 221 and the second supporting sheet 222 is and the less likely the center bracket 22 is to be deformed when the secondary beam 23 is connected with the center bracket 22.

Furthermore, the first supporting sheet and the second supporting sheet are arranged symmetrically and parallel to each other.

Embodiment 3

The embodiment is an improvement made based on Embodiments 1 and 2. In the embodiment, the secondary beam 23 is connected with the primary beam 21 through the center bracket 22 in Embodiment 2. For the structures such as the secondary beam and the supporting block, please refer to Embodiment 1. For the structure of the center bracket, please refer to Embodiment 2. All of the above will not be further explained here.

Embodiment 4

A heliostat, with reference to 1, includes a reflective surface 1 of the heliostat and a heliostat frame connected with the reflective surface 1, wherein the heliostat frame is the heliostat frame according to any one of Embodiments 1 to 3.

A heliostat field includes the heliostat mentioned above.

The preferred embodiments of the present invention disclosed above are only used to help the description of the present invention. The preferred embodiments do not describe all the details, and are not intended to limit the invention only to be the specific embodiments. It is obvious that various modifications and changes can be made to the content of the specification. The present invention selects and specifically describes the embodiments with the purpose of better explaining the principle and practical use of the present invention, such that a person skilled in the art can well understand and utilize the present invention. The present invention is merely limited by the appended claims and the scope and equivalents thereof.

What is claimed is:

1. A heliostat comprising a heliostat frame, comprising a primary beam and a plurality of secondary beams arranged on the primary beam at intervals, the secondary beams being fixed on the primary beam along an extending direction of a center axis of the primary beam, wherein each of the secondary beams is provided with a plurality of supporting block assemblies;

wherein each supporting block assembly comprises a supporting block and an adhesive element, and the supporting block is connected with a reflective surface of a heliostat through the adhesive element;

a height of each of the supporting blocks of each respective secondary beam is configured according to its position on the each respective secondary beam, so that a line connected by centers of top surfaces of all of the supporting blocks on the each respective secondary beam is arc-shaped;

the heliostat frame further includes a plurality of center brackets sleeved fixedly on the primary beam, each respective center bracket of the plurality of center brackets is configured to connect the each respective secondary beam to the primary beam;

the each respective center bracket comprises a first supporting sheet and a second supporting sheet that are spaced apart and parallel to each other, and in the each respective center bracket, the first supporting sheet is fixedly connected with the second supporting sheet through at least one supporting member located there between; and wherein in the each respective center bracket, a first through hole is disposed on the first supporting sheet, a second through hole is disposed on the second supporting sheet, and the first through hole and the second through hole form a center-bracket through hole;

the each respective center bracket is sleeved on the primary beam through the each respective center-bracket through hole and connected fixedly with the primary beam, a first installation spot used to be connected with the each respective secondary beam is disposed on the each respective center bracket, and the each respective secondary beam is connected with the each respective center bracket through respective first installation spot; the heliostat frame further comprising a plurality of first branch beams and a plurality of second branch beams arranged on two sides in an extending direction of the primary beam respectively, each respective first branch beam of the plurality of first branch beams has one end connected with the respective center bracket and the other end connected with the each respective secondary beam, each respective second branch beam of the plurality of second branch beams has one end connected with the respective center bracket and the other end connected with the each respective secondary beam;

an included angle between a straight line passing through a point where the each respective first branch beam is connected with the each respective secondary beam and intersecting perpendicularly to the center axis of the primary beam and an extension line of the each respective first branch beam is greater than or equal to 0° and smaller than or equal to 5°, and an included angle between a straight line passing through a point where the each respective second branch beam is connected with the each respective secondary beam and intersecting perpendicularly to the center axis of the primary beam and an extension line of the each respective second branch beam is greater than or equal to 0° and smaller than or equal to 5°.

2. The heliostat according to claim 1, wherein the each respective secondary beam comprises a secondary-beam top surface, and the supporting blocks of the each respective secondary beam are disposed at an outer surface of the secondary-beam top surface of the each respective secondary beam or embedded on the secondary-beam top surface of the each respective secondary beam; when one of the supporting blocks is embedded in the secondary-beam top surface, a first through hole is disposed on the secondary-beam top surface, and the one of the supporting blocks is embedded in the first through hole; the one of the supporting blocks has a step-shaped longitudinal cross section, and comprises a supporting-block first portion and a supporting-block second portion; a radial width of the supporting-block first portion is smaller than that of the supporting-block second portion, and the supporting-block first portion is embedded in the first through hole on the each respective secondary beam to be connected with the secondary-beam top surface; the supporting-block second portion is connected with the adhesive element.

3. The heliostat according to claim 2, wherein a center position of the one of the supporting blocks is provided with a second through hole, and a bottom portion of the adhesive element is provided with a threaded hole; a bolt passes through the first through hole of the each respective secondary beam and the second through hole of the one of the supporting blocks to be in threaded connection with the threaded hole of the adhesive element.

4. The heliostat according to claim 3, wherein an anti-loose washer is further disposed between the bolt and an inner surface of the secondary-beam top surface.

5. The heliostat according to claim 3, wherein the each respective secondary beam comprises two side surfaces respectively extending from two sides in a length direction of the each respective secondary beam, the each respective secondary beam further comprises a bending portion extending from a free end in a length direction of the side surface thereof.

6. The heliostat according to claim 2, wherein a top surface of the one of the supporting blocks is configured mirror symmetry along a plane bisecting the secondary-beam top surface vertically.

7. The heliostat according to claim 1, wherein the adhesive element comprises a tray used to be fixedly connected with the reflective surface of the heliostat and a base used to support the tray, the center of the tray is provided with a through hole.

8. The heliostat according to claim 1, wherein in the length direction of the each respective secondary beam, the reflective surface comprises two reflective units and a seam located between said reflective units, and a distance between the adhesive elements of the supporting blocks on opposite sides of the seam between adjacent reflective units is smaller than a distance between two adjacent adhesive elements of the supporting blocks at other positions.

9. The heliostat according to claim 1, wherein each supporting member is a supporting post.

10. The heliostat according to claim 9, wherein the first installation spot is formed by two corresponding installation spot units located on the first supporting sheet and the second supporting sheet respectively; the first installation spot is disposed on an upper portion of the each respective center bracket, and the each respective secondary beam is connected with the each respective center bracket at the first installation spot, the each respective center bracket sleeved on the primary beam is provided with the first installation spot; and in a direction respectively extending from a middle position of the primary beam to two ends of the primary beam, distances from all of the first installation spots on the center brackets to a center axis of the primary beam is sequentially increased, so that all of the first installation spots are distributed in an arc with low middle parts and high ends; and the first installation spots on the center brackets are configured in mirror symmetry along a plane perpendicular to the center axis of the primary beam and bisecting the primary beam.

11. The heliostat according to claim 10, wherein a projection of the each respective center bracket on a plane perpendicular to a center axis of the each respective center-bracket through hole is of a hexagonal structure, and a length of a top side of the projection is smaller than a length of a bottom side thereof, a distance from the center axis of the each respective center-bracket through hole to a top surface of the each respective center bracket is greater than a distance from the center axis of the each respective center-bracket through hole to a bottom surface of the each respective center bracket.

12. The heliostat according to claim 11, wherein two first supporting posts are disposed respectively at two sets of top corners corresponding to an upper portion of the first supporting sheet and an upper portion of the second supporting sheet, and two second supporting posts are disposed respectively at two sets of left and right top corners corresponding to a lower portion of the first supporting sheet and a lower portion of the second supporting sheet, a third supporting post is further disposed between the first supporting sheet and the second supporting sheet, and the third supporting post is located at the upper portion of the each respective center bracket and just below a midpoint of a line connecting the two first supporting posts.

13. The heliostat according to claim 12, wherein a distance from the third supporting post to the center axis of the each respective center-bracket through hole is equal to a distance from the two second supporting posts to the center axis of the each respective center-bracket through hole.

14. The heliostat according to claim 12, wherein in the each respective center bracket, the two first supporting posts form a first connecting line segment after two connecting points on the first supporting sheets are connected with each other, and the two first supporting posts form a second connecting line segment after two connecting points on the second supporting sheets are connected with each other;

the installation spot unit corresponding to the first installation spot on the first supporting sheet is located on a vertical bisector of the first connecting line segment along a surface of the first supporting sheet; and the installation spot unit corresponding to the first installation spot on the second supporting sheets is located on a vertical bisector of the second connecting line segment along a surface of the second supporting sheet.

15. The heliostat according to claim 14, wherein a plane where the first connecting line segment and the second connecting line segment are located is a reference plane, and the number of the center brackets with the first installation spot located above the reference plane is equal to the number of the center brackets with the first installation spot located below the reference plane in the center brackets sleeved on the primary beam.

16. The heliostat according to claim 1, wherein the each respective secondary beam comprises one top surface and two side surfaces extending from two sides in a length direction of the top surface respectively, and an upper portion of the each respective center bracket is sandwiched between the two side surfaces of the each respective secondary beam, the each respective first branch beam comprises one top surface and two side surfaces extending from both sides in a length direction of the top surface respectively, and one end of the each respective first branch beam is sandwiched between the first supporting sheet and the second supporting sheet of the each respective center bracket; the each respective second branch beam comprises one top surface and two side surfaces extending from two sides in a length direction of the top surface respectively, and one end of the each respective second branch beam is sandwiched between the first supporting sheet and the second supporting sheet of the each respective center bracket.

17. The heliostat according to claim 1, wherein the first installation spot is formed by two corresponding installation spot units located on the first supporting sheet and the second supporting sheet respectively; the first installation spot is disposed on an upper portion of the each respective center bracket, and the each respective secondary beam is connected with the each respective center bracket at the first installation spot, a second installation spot and a third installation spot are further disposed corresponding to the first installation spot on the each respective center bracket; each of the installation spots is formed by two corresponding installation spot units located on the first supporting sheet and the second supporting sheet respectively; the each respective first branch beam is connected with the each respective center bracket at the second installation spot, and the each respective second branch beam is connected with the each respective center bracket at the third installation spot; the first installation spot, the second installation spot and the third installation spot are distributed according to a shape of an isosceles triangle, and the second installation spot and the third installation spot are arranged symmetrically along a vertical plane passing through the first installation spot and the center axis of the primary beam.

18. The heliostat according to claim 1, wherein each of the supporting blocks is formed by stacking and combining two or more supporting block gaskets, and the height of the each of the supporting blocks is a function of the thicknesses or the number of the supporting block gaskets.

19. A heliostat comprising a heliostat frame, comprising a primary beam and a plurality of secondary beams arranged on the primary beam at intervals, the secondary beams being fixed on the primary beam along an extending direction of a center axis of the primary beam, wherein each of the secondary beams is provided with a plurality of supporting block assemblies;

each supporting block assembly comprises a supporting block and an adhesive element, and the supporting block is connected with a reflective surface of a heliostat through the adhesive element;

a height of each of the supporting blocks of each respective secondary beam is configured according to its position on the each respective secondary beam, so that a line connected by centers of top surfaces of all of the supporting blocks on the each respective secondary beam is arc-shaped; and a plurality of branch beams, wherein each respective branch beam of the plurality of branch beams comprises a branch-beam top surface and two side surfaces respectively extending from two sides in a length direction of the branch-beam top surface; a plurality of hollow holes are disposed on the branch-beam top surface, and a projection of each hollow hole on the each respective secondary beam corresponds to an installation site of the supporting block on the each respective secondary beam, wherein a gasket is disposed at each of places where the each respective branch beam is connected with the each respective secondary beam, the each respective branch beam is connected with the each respective secondary beam through the gasket, and wherein at each of places where the each respective branch beam is connected with the each respective secondary beam, a sum of a thickness of the corresponding gasket and a width between outer sides of two side surfaces of the respective branch beam is equal to a width between inner sides of two side surfaces of the each respective secondary beam.

20. A heliostat comprising a heliostat frame, comprising a primary beam and a plurality of secondary beams arranged on the primary beam at intervals, the secondary beams being fixed on the primary beam along an extending direction of a center axis of the primary beam, wherein each of the secondary beams is provided with a plurality of supporting block assemblies;

wherein each supporting block assembly comprises a supporting block and an adhesive element, and the supporting block is connected with a reflective surface of a heliostat through the adhesive element;

a height of each of the supporting blocks of each respective secondary beam is configured according to its position on the each respective secondary beam, so that a line connected by centers of top surfaces of all of the supporting blocks on the each respective secondary beam is arc-shaped;

the heliostat frame further includes a plurality of center brackets sleeved fixedly on the primary beam, each respective center bracket of the plurality center brackets is configured to connect the each respective secondary beam to the primary beam;

the heliostat frame further comprising a plurality of first branch beams and a plurality of second branch beams arranged on two sides in an extending direction of the primary beam respectively, each respective first branch beam of the plurality of first branch beams has one end connected with the each respective center bracket and the other end connected with the each respective secondary beam, each respective second branch beam of the plurality of second branch beams has one end connected with the each respective center bracket and the other end connected with the each respective secondary beam; and wherein an included angle between a straight line passing through a point where the each respective first branch beam is connected with the each respective secondary beam and intersecting perpendicularly to the center axis of the primary beam and an extension line of the each respective first branch beam is greater than or equal to 0° and smaller than or equal to 5°, and an included angle between a straight line passing through a point where the each respective second branch beam is connected with the each respective secondary beam and intersecting perpendicularly to the center axis of the primary beam and an extension line of the each respective second branch beam is greater than or equal to 0° and smaller than or equal to 5°.

* * * * *